US008019742B1

(12) United States Patent
Baluja et al.

(10) Patent No.: US 8,019,742 B1
(45) Date of Patent: Sep. 13, 2011

(54) IDENTIFYING RELATED QUERIES

(75) Inventors: Shumeet Baluja, Santa Clara, CA (US); Michele Covell, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 413 days.

(21) Appl. No.: 11/756,127

(22) Filed: May 31, 2007

(51) Int. Cl.
G06F 7/00 (2006.01)
G06F 17/30 (2006.01)

(52) U.S. Cl. ......... 707/706; 707/721; 707/751; 706/58
(58) Field of Classification Search .......... 707/3, 4, 707/5, 706, 721, 727, 751; 705/10; 382/115, 382/131; 715/854; 706/58
See application file for complete search history.

(56) References Cited

U.S. PATENT DOCUMENTS

| 5,544,281 | A | * | 8/1996 | Maruoka et al. ............ 706/58 |
| 5,748,851 | A | * | 5/1998 | Iokibe et al. ............ 706/58 |
| 5,841,890 | A | * | 11/1998 | Kraske ............ 382/131 |
| 6,240,409 | B1 | * | 5/2001 | Aiken ............ 707/4 |
| 6,460,029 | B1 | * | 10/2002 | Fries et al. ............ 707/3 |
| 6,463,426 | B1 | * | 10/2002 | Lipson et al. ............ 707/3 |
| 6,484,162 | B1 | * | 11/2002 | Edlund et al. ............ 707/3 |
| 6,532,307 | B1 | * | 3/2003 | Sato ............ 382/240 |
| 6,701,309 | B1 | * | 3/2004 | Beeferman et al. ............ 707/3 |
| 6,760,724 | B1 | * | 7/2004 | Chakrabarti et al. ............ 707/4 |
| 7,200,584 | B2 | * | 4/2007 | Sakurai ............ 706/58 |
| 7,292,634 | B2 | * | 11/2007 | Yamamoto et al. ...... 375/240.16 |
| 7,296,011 | B2 | * | 11/2007 | Chaudhuri et al. ............ 707/3 |
| 7,356,171 | B2 | * | 4/2008 | Werthiem et al. ............ 382/124 |
| 7,571,162 | B2 | * | 8/2009 | Sun et al. ............ 707/5 |
| 7,580,813 | B2 | * | 8/2009 | Thiesson et al. ............ 703/2 |
| 7,752,557 | B2 | * | 7/2010 | Hoeber et al. ............ 715/761 |
| 7,792,769 | B2 | * | 9/2010 | Kant et al. ............ 706/45 |
| 2002/0019763 | A1 | * | 2/2002 | Linden et al. ............ 705/10 |
| 2003/0110163 | A1 | * | 6/2003 | Chen et al. ............ 707/3 |
| 2004/0254920 | A1 | * | 12/2004 | Brill et al. ............ 707/3 |
| 2006/0104484 | A1 | * | 5/2006 | Bolle et al. ............ 382/115 |
| 2006/0110043 | A1 | * | 5/2006 | Reissman ............ 382/203 |
| 2010/0104158 | A1 | * | 4/2010 | Shechtman et al. ............ 382/131 |

OTHER PUBLICATIONS

Chien et al, Semantic Similarity Between Search Engine Queries Using Temporal Correlation, May 10-14, 2005, ACM, www 2005; proceedings of the 14th international conference on world wide web, pp. 2-11.*

Li et al, A Survey on Wavelet Applications in Data Mining, Dec. 2002, ACM SIGKDD Explorations NewsLetter, vol. 4 Issue 2, pp. 49-68.*

Das et al, Google News Personalization: Scalable Online Collaborative Filtering, May 8-12, 2007, ACM—www 07—Proceedings of the 16th international conference on world wide web, pp. 271-280.*

Chakrabarti et al, Approximate query processing using wavelets, Sep. 2001, Springer-Verlag New York, vol. 10 Issues 2-2, pp. 199-223.*

(Continued)

Primary Examiner — Yicun Wu
Assistant Examiner — Pavan Mamillapalli
(74) Attorney, Agent, or Firm — Fish & Richardson P.C.

(57) ABSTRACT

A method includes receiving search queries. Images are generated that represent the volume of each search query relative to all search queries over a period of time. The images are processed to generate wavelets for each image. Related queries having similar increases or decreases in volume are identified by comparing at least some of the wavelets corresponding to a first query to wavelets corresponding to other queries.

47 Claims, 7 Drawing Sheets

OTHER PUBLICATIONS

A. C. Gilbert, Y. Kotidis, S. Muthukrishnan, and M. Strauss, Surfing wavelets on streams: One-pass summaries for approximate aggregate queries, The VLDB Journal, p. 79-88, 2001.

A. Zhai, P. Huang, and T. J. yu Pan, A study on web-log using wavelet, Research and Development Information Retrieval, 2001.

C. E. Jacobs, A. Finkelstein, and D. H. Salesin, Fast multiresolution image querying, Computer Graphics, 29(Annual Conference Series):277-286, 1995.

C. Shahabi, S. Chung, M. Safar, and G. Hajj. 2d TSAtree: A wavelet-based approach to improve the efficiency of multi-level spatial data mining, Statistical and Scientific Database Management, p. 59-68, 2001.

C. Shahabi, X. Tian, and W. Zhao. Tsa-tree: A Wavelet-based approach to improve the efficiency of multi-level surprise and trend queries on time-series data, Statistical and Scientific Database Management, p. 55-68, 2000.

J. B. T. M. Roerdink and M. A. Westenberg, Wavelet-based Volume Visualization, Nieuw Archief voor Wiskunde, 17(2):149-158, 1999.

J. S. Vitter and M. Wang, Approximate computation of multidimensional aggregates of sparse data using wavelets, p. 193-204, 1999.

J.S.Vitter, M. Wang, and B. Iyer, Data cube approximation and histograms via wavelets, Proc. of the 7th Intl. Conf. On Information and Knowledge Management, 1998.

K. Chakrabarti, M. Garofalakis, R. Rastogi, and K. Shim, Approximate query processing using wavelets, VLDB Journal: Very Large Data Bases, 10(2-3):199-223, 2001.

K. pong Chan and A. W.-C. Fu, Efficient time series matching by wavelets, ICDE, p. 126-133, 1999.

M. Garofalakis and P. B. Gibbons, Wavelet synopses with erro guarantee, Proceedings of 2002 ACM SIGMOD, Madison, Wisconsin, USA, Jun. 2002, ACM Press.

Y. Matias, J. S. Vitter, and M. Wang, Dynamic maintenance of wavelet-based histograms, VLDB'00, Morgan Kaufmann, 2000.

Y. Matias, J. S. Vitter, and M. Wang, Wavelet-based histograms for selectivity estimation, ACM SIGMOD, p. 448-459, ACM Press, 1998.

Y.-L. Wu, D. Agrawal, and A. E. Abbadi, A comparison of DFT and DWT based similarity search time-series databases, CIKM, p. 488-495, 2000.

S. Chien and N. Immorlica, "Semantic similarity between search engine queries using temporal correlation," In Proc. 14th Int. Conf. on World Wide Web (WWW '05). ACM, New York, NY, USA, 2-11 (2005).

C. E. Jacobs, A. Finkelstein, and D. H. Salesin "Fast multiresolution image querying," In Proc. of SIGGRAPH '95, ACM, p. 277-286 (1995).

M. Vlachos, C. Meek, Z. Vagena, and D. Gunopulos. "Identification of similarities, periodicities and bursts for online search queries," in Int. Conf. Mgmt. Data (SIGMOD), Paris, France (2004).

* cited by examiner

IDENTIFYING RELATED QUERIES

FIELD

The following disclosure relates to information retrieval.

BACKGROUND

Locating a desired portion of information on the World Wide Web ("web") can be challenging because the amount of information available. Query processing systems permit a user to search information on the web, and attempt to return search results that are relevant to a search query provided by the user. The goal of a query processing system is to provide links to high quality, relevant search results (e.g., links to web pages) to the user based on the search query.

SUMMARY

According to one aspect, there is disclosed a method. The method can include receiving a first search query and a second search query, generating a first image based on the first search query, and a second image based on the second search query, and determining if the first search query and the second search query are related by comparing the first image to the second image.

One or more of the following features may also be included. The method can include determining a query volume associated with the first search query during a period of time, and a query volume associated with the second search query during the period of time. Determining if the first search query and the second search query are related can include determining that the first search query and the second search query are related when the query volume associated with the first search query and the query volume associated with the second search query exhibit a similar rise or decrease during the period of time. Generating a first image based on the first search query, and a second image based on the second search query can include generating the first image based on the query volume associated with the first search query, and generating the second image based on the query volume associated with the second search query.

According to another feature, determining if the first search query and the second search query are related can include determining that the first search query and the second search query are related when the first image and the second image exhibit similar rises or decreases in query volume during the period of time. Determining a query volume associated with the first search query, and a query volume associated with the second search query can also include determining the query volume associated with the first search query based on the search volume of the first search query relative to all queries during the period of time, and determining the query volume associated with the second search query based on the search volume of the second search query relative to all queries during the period of time. Additionally, the method can include displaying that the first search query and the second search query are related.

According to another aspect, there is a method that includes generating a first image based on a first search query, generating a second image based on a second search query, processing the first image to generate a first set of wavelets corresponding to the first image, processing the second image to generate a second set of wavelets corresponding to the second image, and determining if the first search query and the second search query are related by comparing at least some of the first set of wavelets to at least some of the second set of wavelets.

According to a feature, the method can include identifying a first subset of top wavelets from the first set of wavelets, and identifying a second subset of top wavelets from the second set of wavelets. Determining if the first search query and the second search query are related can include determining if the first search query and the second search query are related by comparing the first subset of top wavelets to the second subset of top wavelets.

According to yet another aspect, a method is disclosed. The method includes generating a plurality of images, where each image is associated with a respective search query of a plurality of search queries, processing the plurality of images to generate a set of wavelets for each of the plurality of images, and identifying a respective subset of top wavelets for each set of wavelets. The method also includes generating signatures for each of the plurality of images based on the subset of top wavelets for each respective image, and determining if a first search query of the plurality of search queries is related to a second search query of the plurality of search queries by comparing a signature corresponding to the first query to a signature corresponding to the second search query.

According to a feature, generating signatures for each of the plurality of images based on the subset of top wavelets for each respective image includes generating signatures for each of the plurality of images using a min-hash algorithm to compress the subset of top wavelets. Additionally, the method can include identifying at least a portion of signatures for comparison using a hashing scheme, which can be a locality sensitive hashing scheme.

These general and specific aspects may be implemented using a system, a method, or a computer program, or any combination of systems, methods, and computer programs. Aspects of the invention can include none, one or more of the following advantages. Search results can be provided to user based on a user provided query and one or more system identified second queries that are determined to be related. While conventional query processing systems provide search results to users based on their queries, they are ineffective at providing a user with search results based on related queries that may identify relevant search results to the user even though the related queries differ from the user's query.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

The present disclosure now will be described more fully hereinafter with reference to the accompanying drawings, in which some, but not all implementations are shown. Indeed, these implementations can be embodied in many different forms and should not be construed as limited to the implementations set forth herein; rather, these implementations are provided so that this disclosure will satisfy applicable legal requirements. Like numbers refer to like elements throughout.

The following disclosure describes systems, methods, and computer program products that can identify related search queries that exhibit similar rises or decreases in volume over a period of time. In this disclosure, the term "site" or "website" includes any domain or subdomain (e.g., google.com, labs.google.com, etc.) or a domain plus a uniform resource locator prefix (e.g., geocities.com/Athens/). Additionally, although the disclosure focuses on searches related to web sites, implementations are also applicable to searching any machine-readable and machine-storable information (e.g., document).

This disclosure is described with reference to block diagrams and flowchart illustrations of methods, apparatuses (i.e., systems) and computer program products. It will be understood that blocks of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function (s) specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the function(s) specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
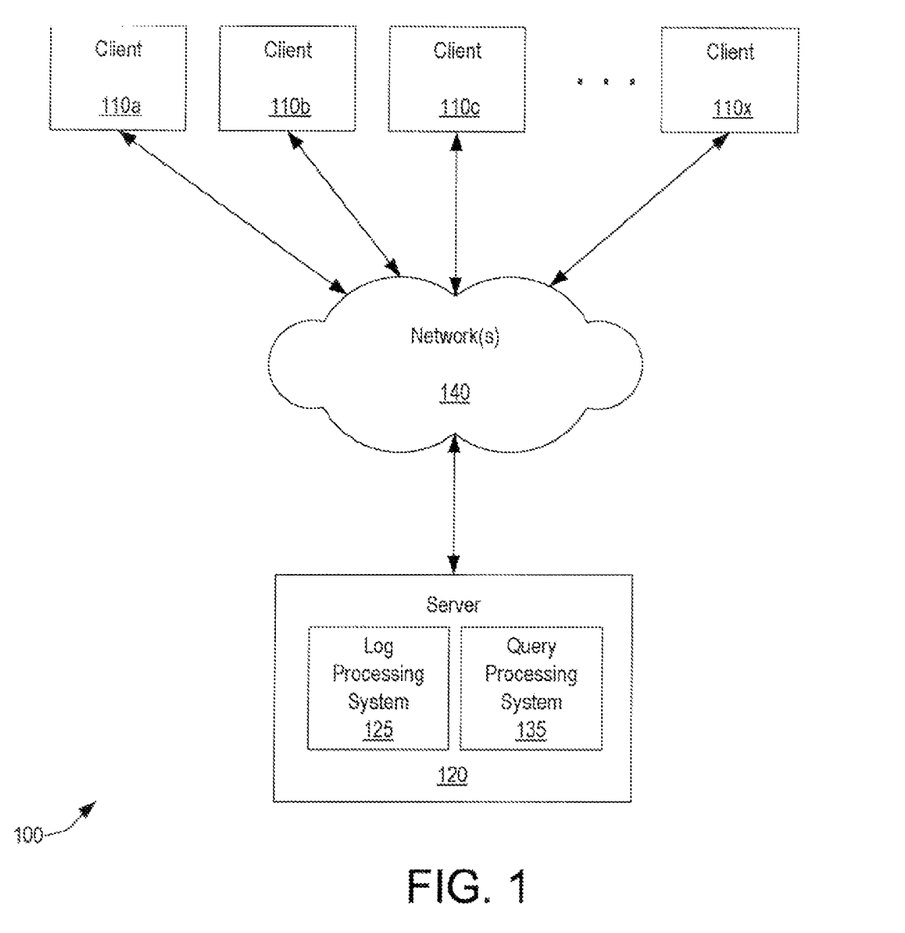
FIG. 1 shows an example search system.

Referring now to FIG. 1, an example search system 100 is shown according to an illustrative implementation. The system 100 includes clients 110a, 110b, 110c, . . . 110x in communication with a server 120 via one or more networks 140. Although multiple clients 110a, 110b, 110c, . . . 110x and a single server 120 are illustrated in FIG. 1, there can be more servers and more or fewer clients. For instance, some of the functions performed by the server 120 can be performed by one or more other servers such that the server 120 can represent several devices, such as a network of computer processors and/or servers. Additionally, in some implementations a client can perform a function of the server 120 and the server 120 can perform a function of a client. Other architectures, i.e., non client server, are possible.

The clients 110a, 110b, 110c, . . . 110x can include a device, such as a personal computer, a wireless telephone, a personal digital assistant (PDA), a lap top computer, or another type of computation or communication device, a thread or process running on one of these devices, and/or an object executable by one of these devices. The server 120 can include one or more servers that gather, process, maintain, manage information and/or provide search results to users. In an example implementation, the server 120 can include a log processing system 125 that processes and stores information associated with, for example, search queries, such as search queries input by clients' 110a, 110b, 110c, . . . 110x. The server 120 can also include a query processing system 135 usable by the clients 110a, 110b, 110c, . . . 110x. The query processing system 135 can identify search queries and determine those related search queries, e.g., those having similar rises or decreases in volume.

The network(s) 140 can include one or more local area networks (LANs), wide area networks (WANs), telephone networks, such as the Public Switched Telephone Network (PSTN), intranets, the Internet, and/or or other type of network. The clients 110a, 110b, 110c, . . . 110x and server 120 can connect to the network(s) 140 via wired, wireless, or optical or other connections. In alternative implementations, one or more of the devices illustrated in FIG. 1 are directly connected to another one of the devices. For example, in one implementation, the clients 110a, 110b, 110c, . . . 110x are directly connected to the server 120.

Figure 2:
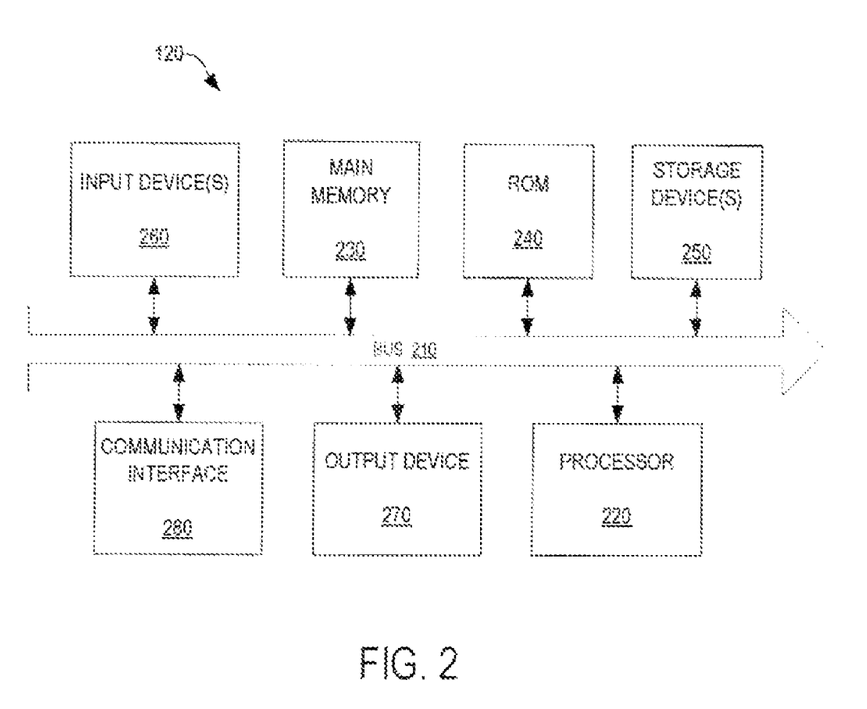
FIG. 2 shows an example server in the search system of FIG. 1, according to an illustrative implementation.

FIG. 2 shows the server 120 of FIG. 1, according to an illustrative implementation. The server 120 can include a bus 210, a processor 220, a main memory 230, a read only memory (ROM) 240, a storage device 250, one or more input devices 260, one or more output devices 270, and a communication interface 280. The bus 210 can include one or more paths that permit communication among the components of server 120.

The processor 220 includes any type of conventional processor, microprocessor or processing logic that interprets and executes instructions. The main memory 230 can include a random access memory (RAM) or another type of dynamic storage device that stores information and instructions for execution by processor 220. The ROM 240 can include a conventional ROM device or another type of static storage device that stores static information and instructions for use by the processor 220, including, for instance, an operating system. Additionally, the storage device 250 can include a magnetic and/or optical recording medium and its corresponding drive.

The server 120 can also include an input device 260 having one or more conventional mechanisms that permit a user to input information to the server 120, such as a keyboard, a mouse, a pen, voice recognition and/or biometric mechanisms, or the like. The output device 270 includes one or more conventional mechanisms that output information to the user, such as a display, a printer, a speaker, or the like. The communication interface 280 can include any transceiver-like mechanism that enables the server 120 to communicate with other devices and/or systems. For example, the communication interface 280 can include mechanisms for communicating with another device or system via one or more networks, such as the network(s) 140.

In operation the server 120 can store data associated with individual search queries and/or search results (e.g., web pages) and can perform searches based on inputs from clients 110a, 110b, 110c, . . . 110x. In one implementation, the server 120 performs these operations in response to the processor 220 executing software instructions contained in a computer-readable medium, such as memory 230. The software instructions can be read into the memory 230 from another computer readable medium, such as a data storage device 250, or from another device via the communication interface 280. The software instructions contained in the memory 230 cause processor 220 to perform processes described in this disclosure. Alternatively, hardwired circuitry can be used in place of or in combination with software instructions to implement processes consistent with the disclosure. Thus, implementations are not limited to any specific combination of hardware circuitry and software.

Figure 3:
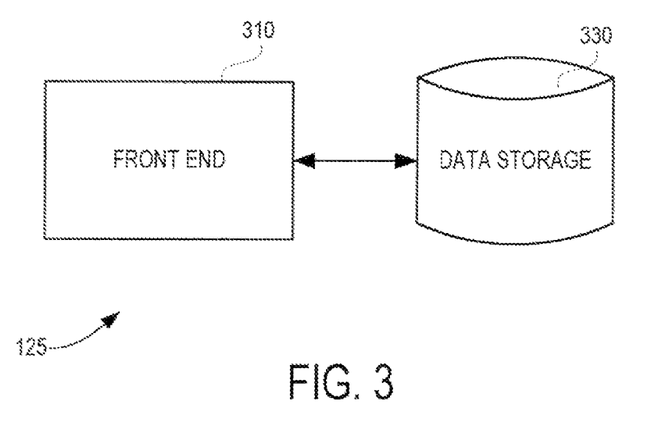
FIG. 3 shows an example log processing system in the search system of FIG. 1, according to an illustrative implementation.

FIG. 3 is a functional block diagram of an example log processing system 125 of FIG. 1, according to an illustrative implementation. The log processing system 125 can include a front end 310 and a data storage 320. The logical blocks illustrated in FIG. 3 can be implemented in software, hardware, or a combination of hardware and software. In addition, each of the functional blocks can represent one or more computer processors, threads, and/or objects. It should also be understood that in alternative implementations, the functions performed by one of the blocks in FIG. 3 can be performed by another block. In other implementations, a single logical block/processing device can perform at least some of the functions of the log processing system 125.

The front end 310 receives information associated with clients' 110a, 110b, 110c, . . 110x input of search queries and/or access of various web pages/sites. For example, the front end 310 can receive search queries when a client 110a, 110b, 110c, . . . 110x inputs a search query into a search engine, such as Google®. The front end 310 can forward this information to the data storage 320, which can store the search queries. For example, the data storage 320 can include information identifying search queries that have been entered by clients 110a, 110b, 110c, . . . 110x. The data storage 320 can also store information indicating a total number of times each of the search queries has been entered by clients 110a, 110b, 110c, . . . 110x and/or the particular times and/or dates the search queries have been entered. For instance, the data storage 320 can include the total number of queries for each day, and the total number of times a particular search query has been entered in a given day. The data storage 320 can store this search query and/or related information corresponding to a past period of time, such as 30 days, a year, or the like. Alternatively, or in addition to the information described above, the data storage 320 can store a list or ranking of top search queries.

Figure 4:
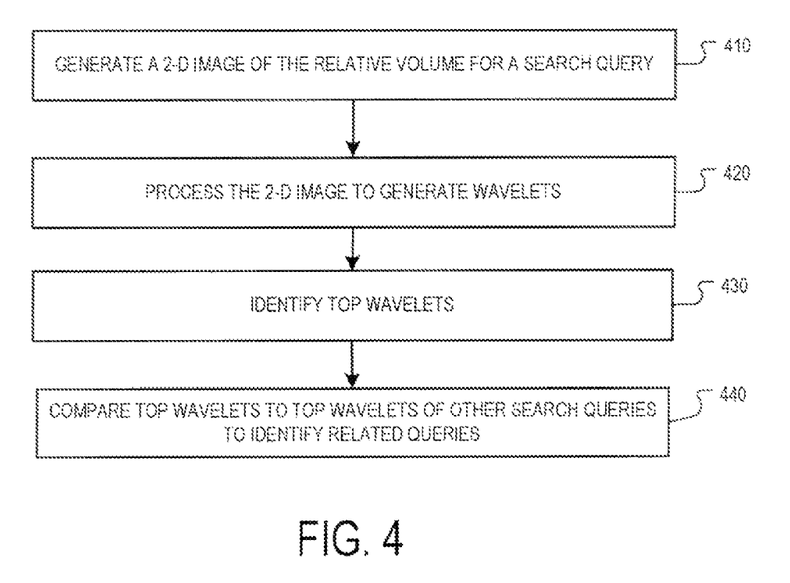
FIG. 4 shows a block diagram flow chart illustrating an example method of identifying related queries, according to an illustrative implementation.

FIG. 4 shows a block diagram flow chart illustrating an example method of identifying related queries, according to an illustrative implementation. In particular, the method permits the identification of search queries that exhibit similar rises or decreases in volume over a period of time. The method begins with the generation of a 2-D image representing the relative volume of a search query (block 410). The relative volume represented may include the relative volume of the search query over a period of time. Next, the 2-D image is processed to generate wavelets representing the 2-D image (block 420). One example method for generating wavelets is described in 'Wavelets for computer graphics: A primer, part 1', by Eric J. Stollnitz, Tony D. DeRose, and David H. Salesin, IEEE Computer Graphics arid Applications, 15(3): 76-84, May 1995, the contents of which are incorporated by reference. Top wavelets, which include high magnitude coefficients and/or represent significant characteristics of the 2-D image, are identified (block 430). The top wavelets corresponding to the 2-D image are compared to the top wavelets of other search queries to identify related queries (block 440). According to an implementation, once identified, related queries for a particular query entered by a user may be displayed to the user, and/or search results for the related query may be provided to the user along with the search results for the query entered by the user.

Figure 5:
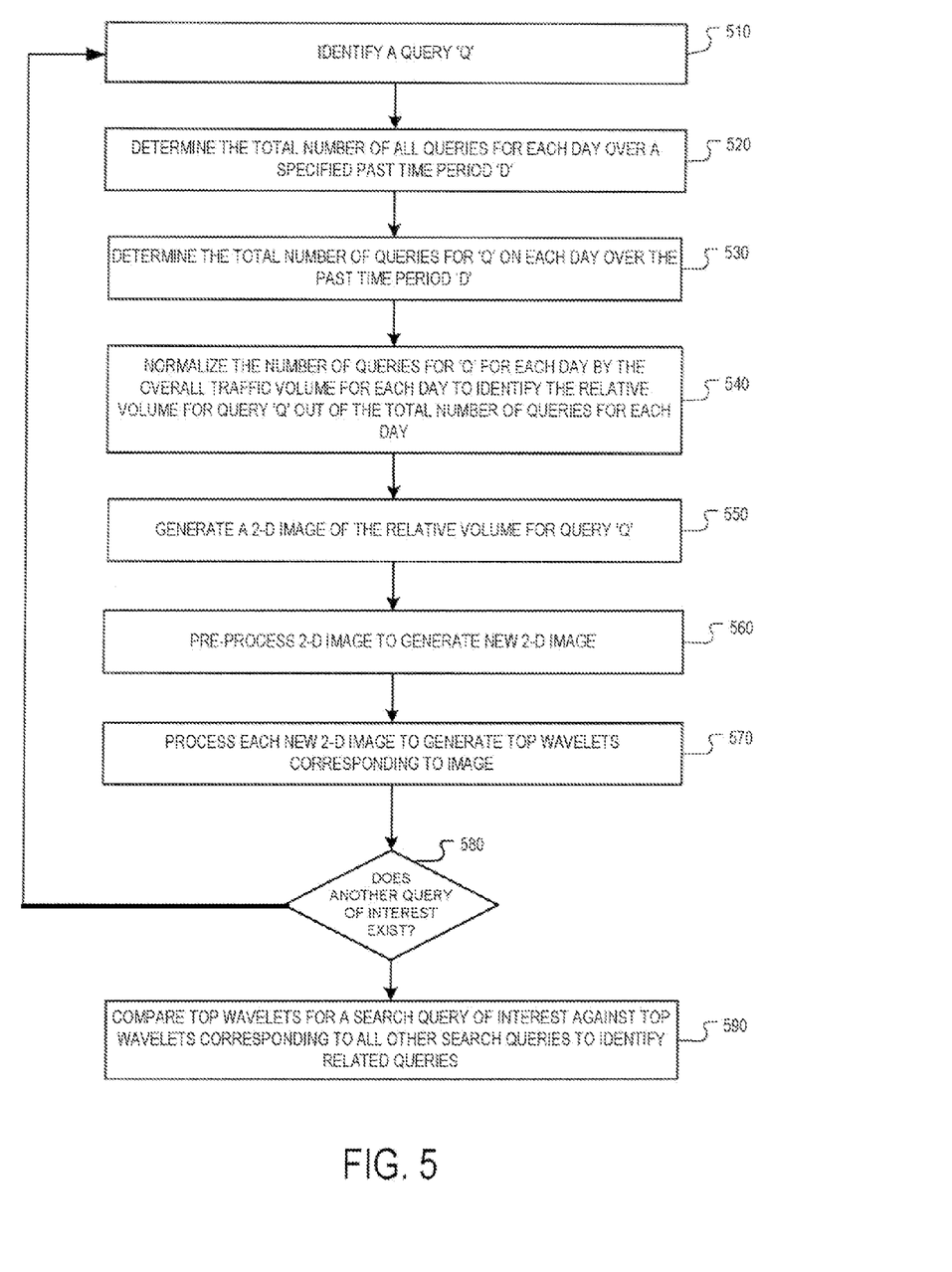
FIG. 5 shows a block diagram flow chart illustrating an example method of identifying related queries, according to another illustrative implementation.

FIG. 5 shows a block diagram flow chart illustrating an example method of identifying related queries, according to another implementation. According to an implementation, the method can be implemented by the server 120 of FIG. 1. A search query of interest is identified, where the search query is referenced as 'Q' in FIG. 5 for convenience (block 510). The search query 'Q' can be received at the server 120 from one of more clients 110a, 110b, 110c, . . . 110x and optionally stored by the log processing system 125 within the data storage 330. According to an implementation, the search query 'Q' can be identified by the query processing system 135 of the server 120. The query processing system 135 can identify the search query 'Q' as a query of interest, for instance, as a search query stored in the data storage 330 that ranks as a top search query received from the one or more clients 110a, 110b, 110c, . . . 110x. As an illustrative example, the query processing system may identify the search query 'Q' as one of the top 1,000,000 search queries stored in a list or ranking of search queries received by the server 120.

Next, the total number of all search queries for each smallest-desired-time unit 'H' (e.g., one day) over a specified past time period 'D' are identified (block 530). According to an implementation, the query processing system 135 can collect and/or tally the total number of queries for each time unit 'H' over a specified past time period from information stored within the data storage 330 of the log processing system 125. The number of time units 'H' for which the total number of queries are collected may vary, such as 30 days, 90 days, a year, or the like. According to an implementation, the number of time units 'H' are adjustable by a user associated with a client 110a, 110b, 110c, . . . 110x or an administrator associated with the server 120. The number 'D' of time units 'H' establishes a historical window for which search queries will be examined to identify search queries exhibiting similar rises or decreases in volume.

The total number of queries for search query 'Q' during each time unit 'H' over the specified past time period 'D' is identified (block 530). According to an implementation, the query processing system 135 can collect and/or tally the total number of queries for search query 'Q' for each time unit 'H' over the specified past time period from information stored within the data storage 330 of the log processing system 125.

Next, the number of queries for search query 'Q' for each time unit 'H' are normalized by, for example, the queries-per-time-unit for that day (block 540) to identify the relative volume for the search query 'Q' out of the total volume. Normalizing permits the identification of increases and decreases for a search query by eliminating the effects of increasing query volumes. For instance, on a particular hour, there may be 10 requests for search query 'Q' out of a total of 100 search queries/hour for that day, where a request for search query 'Q' represents 10% of search queries. At the same hour on a different day, there may be 20 requests for search query 'Q' out of a total of 1000 search queries/hour for that day, such that requests for the search query 'Q' represents only 2% of search queries. Although the number of search queries for 'Q' rise from 10 to 20 in the above examples, the relative volume of search queries for 'Q' decline from 10% to 2%. According to an implementation, the normalization can be implemented by the query processing system 135.

Figure 6:
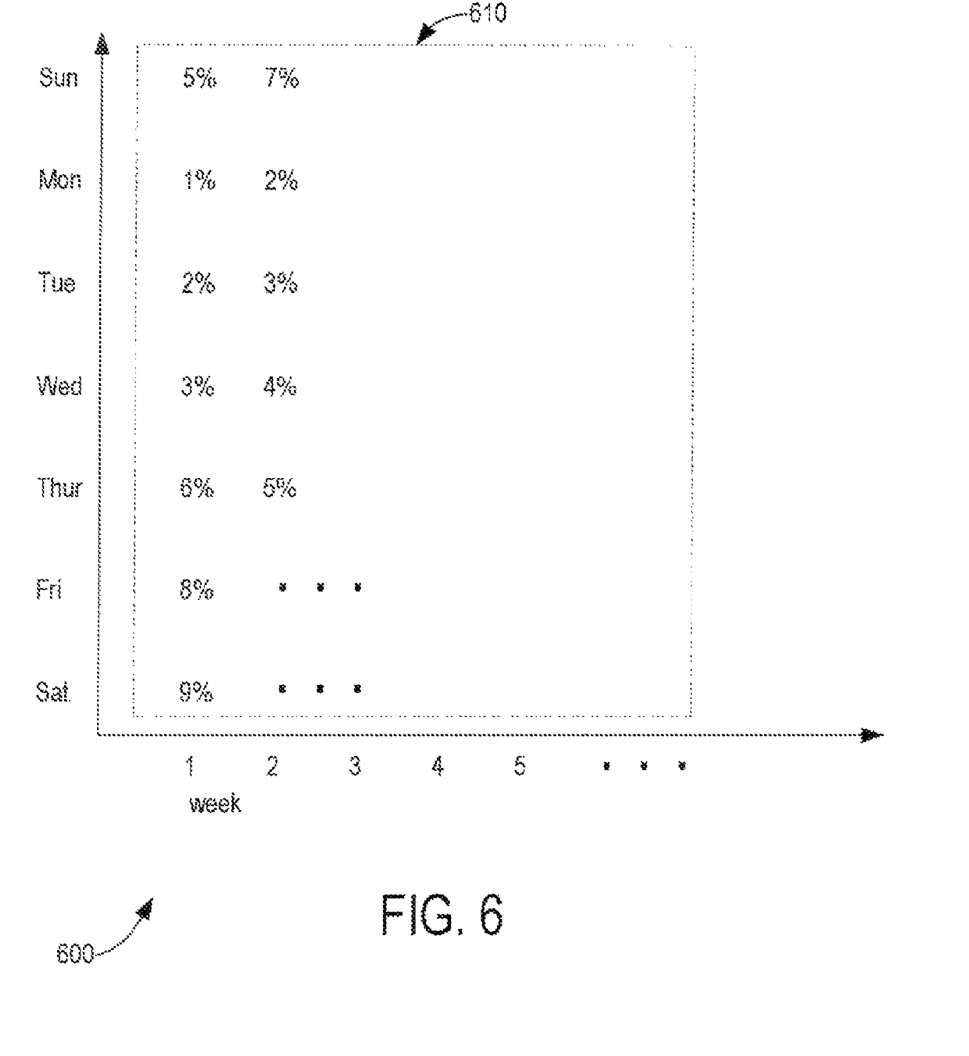
FIG. 6 shows an illustrative 2-D image of relative query volume for a search query, according to an implementation.

A two-dimensional image is generated of the relative query volume for the search query 'Q', which represents the percentage of the total volume of queries that the search query 'Q' represented across a period of time (block 550). According to an implementation, the two-dimensional image illustrates the percentage of total volume of a search query 'Q' across the past time period 'D'. The two-dimensional image can be generated by the query processing system 135. FIG. 6 shows an illustrative graph 600 including a two dimensional image 610 illustrating the relative query volume for a search query 'Q'. Although the two dimensional image 610 shown in FIG. 6 includes the relative query volume, in percentage points, for a particular search query on each time unit 'H' over the course of several weeks, the two dimensional image 610 can alternatively be illustrated by a 3-D surface, histogram, 2-D line, line graph, bar graph, or other image that graphically illustrates relative query volume over a period of time.

According to an implementation, the query processing system 135 pre-processes each 2-D image by blurring the images (block 560). Blurring an image creates a new, processed image from the original 2-D image where each pixel in the new image is a weighted average of the original pixel and its neighboring pixels. This process softens the hard edges of an image, which aids in matching processes so that edges (and thus image contents) do not have to be exactly aligned for a match to be identified. According to another implementation, the query processing system 135 can effect blurring of an original 2-D image by applying a Gaussian blur filter or convolving the image with a small sub-image that will weight an original pixel value based on the value of each of its surrounding neighbors. For instance, convolving an image with the sub-image $$\begin{matrix} 1 & 1 & 1 \\ 1 & 5 & 1 \\ 1 & 1 & 1 \end{matrix}$$

will weight the original pixel's value as 5× the value of each of its surrounding eight neighbors. Larger sub-images may be used that take into account more neighbors, and different weightings may also be used.

According to an implementation, each pre-processed image is processed to generate wavelets to represent the image (block 570). Wavelets are a known mathematical tool for hierarchically decomposing functions, and can be used to represent a 2-D image. The top wavelets for each pre-processed image are identified (block 570). The top wavelets are those wavelets that have high magnitude coefficients, and which represent the main characteristics of the image. According to an implementation, the top wavelets include those whose magnitude exceeds a threshold value. The threshold value can be automatically determined as a function of the size of an image or may encompass a top percentage of the wavelets. For instance, the threshold value may be set to include the top 10% of the wavelets. According to another implementation, the threshold value may be manually set, such as the top 100 wavelets.

The top wavelets can be represented as quantized top wavelets that represent a binary vector (block 580), where the top wavelets can be represented by a limited number of bits. According to an implementation, 2 bits are assigned to every wavelet coefficient. To effect this, the coefficients can be sorted based on their magnitude, irrespective of whether the coefficient is positive or negative. If a top wavelet is positive, it is assigned a value of 01, and if it is negative it is assigned a value of 10. Wavelets that do not exceed a threshold value are assigned a value of 00. According to another implementation, more bits can be used to identify whether wavelets exceed additional threshold values. For instance, 3 or more bits may be used and assigned to wavelets based on whether the wavelet is positive, negative, and/or exceeds two or more threshold values.

According to another implementation, after the top wavelets can be identified, the top wavelets can be subjected to another combination of transformation and quantization to extract a description of the 2-D pre-processed image. For instance, an alternative transformation could be effected by removal, variance normalization and projection using a PCA (Principal Components Analysis) basis learned from data derived from a previous time period. An illustrative example of an alternative quantization is a 5-level quantization defined by each coefficients' expected percentile values. For instance, 10%, 30%, 70%, and 90% could be the dividing lines for the quantization levels represented by −2, −1, 0, 1, 2.

According to an implementation, the generation of quantized top wavelets for queries (blocks 510, 520, 530, 540, 550, 560, 570) is performed for each search query of interest (block 580), such as search queries identified in a list or ranking of search queries received by the server 120. The quantized top wavelets for each query of interest can be stored in memory, for instance, the data storage 330.

Next, the quantized top wavelets for the particular query are compared with all of the quantized top wavelets associated with other search queries (block 590). According to an implementation, this may be performed by the log processing system 125. In one implementation, a related query to the particular query is determined by identifying the stored query in the database that includes the most similar top wavelets (i.e., coefficients) to the particular query (block 590). To effect the comparison, the binary vectors representing the quantized top wavelets are compared against other binary vectors to identify the bit positions that are similar or different. Similar binary vectors differ in fewer bit positions that vectors that differ. According to an implementation, the queries that are most similar may be ranked in terms of their similarity, and a threshold value can be used to identify those queries that are deemed similar. For instance, the top 5 or 10 percent of vectors, ranked in terms of their similarity, may be deemed to be similar queries.

Figure 7:
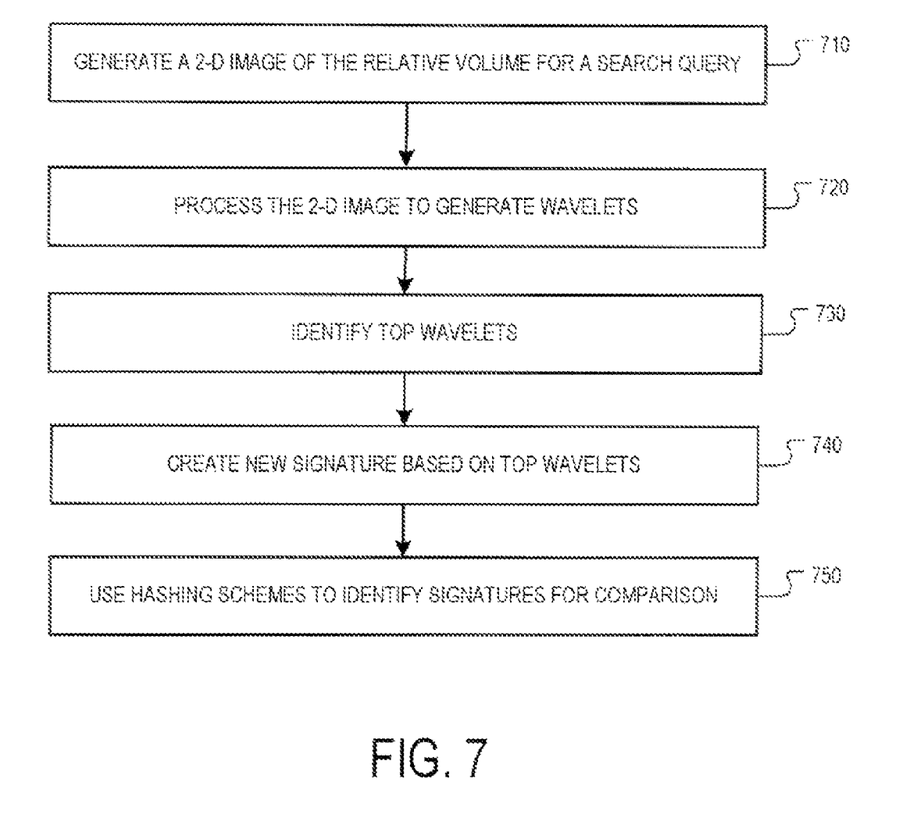
FIG. 7 shows a block diagram flow chart illustrating an example method of identifying related queries, according to another illustrative implementation.

FIG. 7 shows a block diagram flow chart illustrating an example method of identifying related queries, according to another illustrative implementation. The method begins with the generation of a 2-D image representing the relative volume of a search query (block 710). The 2-D image is then processed to generate wavelets representing the 2-D image (block 720). The top wavelets are identified (block 730). To reduce the number of images that must be compared to a particular query of interest to identify related queries for that query, signatures are generated based on the top wavelets (block 740).

According to an implementation, a Min-Hash algorithm may be used to create the signature by compressing the number of top-wavelets. For instance, for each top-wavelet vector, a binary vector (i.e., a row of 0/1 numbers) can be generated, with a '0' in position 'I' if the wavelet-I is not within a top number of wavelets, such as within the top 1000 wavelets for an image. If the wavelet-I is within the top number of wavelets, position 'I' can be a '1' value. Next, an arbitrary value for reducing the number of top wavelets is selected, such as 50 or 100, which is used to identify the independent permutations of the generated rows. For each permutation, the first row position in which there is a 1 is identified. The value of the first position can be concatenated and used as the new signature of an image. According to an implementation, the process of creating a new signature may be implemented by the log processing system 125 and new signatures may be stored in the data storage 330.

After the new signatures are generated corresponding to each search query to be compared, one or more hashing schemes can be used to identify those signatures that should be compared to identify related queries (block 750). According to an implementation, a locality-sensitive hashing (LSH) scheme can be implemented, for instance, by the log processing system 125. LSH selects small, random, but non-overlapping members of the signature and hashes them into bins repeatedly (for instance, 10 or 20 times) to ensure that no member of a signature is used twice. With each query, the same division of signatures is used to effect the hashing. As an illustrative example, if the first members of a signature that are hashed are from positions 1, 5, 8, 10, 91, and 101, then every query will have members from those same positions that are hashed. According to an implementation, each set of hashes are stored in their own hash table, such that the number of hash sets corresponds to the number of hash tables, and every query includes a subset of members hashing to the same number of hash tables. Using this technique, which may be implemented by the log processing system 125, permits a signature associated with a particular query of interest to be compared against a small number of signatures (associated with other search queries) in matching bins instead of all signatures. The bins, according to an implementation, are stored within the data storage 330

As an illustrative example, if a new search query has a signature that is hashed into 20 hash tables, queries within each of the locations of the 20 hash tables are examined. Using this process the system can determine those queries that are most often identified within the same hash tables. Where a query is located in many of the same hash tables, it is likely that the query has many of the same values in many of the same hash positions, which results in the system determining that the a query is related to the new search query.

Although the above implementations are described with respect to a 2-D image, images of other dimensions can also be implemented and used to identify related queries using the techniques described herein. For instance, a 1-dimensional image could be used, such as a 1-dimensional image illustrating the relative query volume of a particular query for each day of a week. A 3-D dimensional image could be used to break down the relative volume of a query based on weeks (one axis), days (second axis), and hours of the day (third axis). Still other variables may be used to create 4 or 5 dimensional images. For instance, a 4-D dimensional image could include the same axis described in the 3-D image, plus an additional axis representing the countries of origin for a search query. Yet another variable could be represented by a $5^{th}$ axis to generate a 5-D dimensional image, such as a property or origin of the query. For instance, a Google™ query may be defined as a froogle query, web query, image query, or the like.

Figure 8:
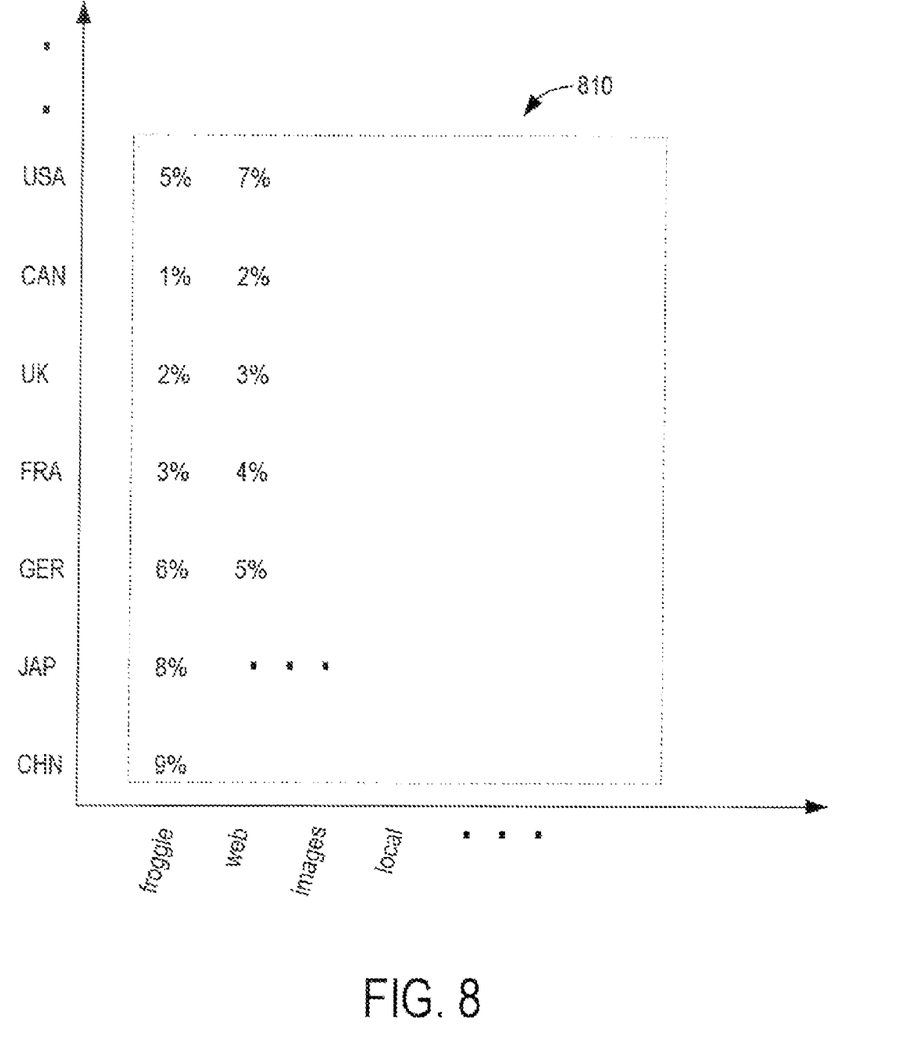
FIG. 8 shows an illustrative 2-D image of relative query volume for a search query, according to another implementation.

FIG. 8 shows an illustrative 2-D image 810 of relative query volume for a search query, according to another implementation. The 2-D image 810 of FIG. 8 does not include a time axis because the 2-D image corresponds to a particular period of time, such as a day, hour, or week. A series of 2-D images like the illustrative 2-D image 810 of FIG. 8 permits the matching of multiple images for each query without utilizing time as an image axis. This permits the matching of queries illustrating similar volume decreases or increases but not necessarily at the same time. For instance, two seemingly unrelated search queries run at different times of the year may exhibit the same query volume trends even though the search queries are temporally shifted.

It will be apparent to one of ordinary skill in the art that aspects of the invention, as described above, can be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

That which is claimed:

1. A computer-implemented method comprising:
receiving information identifying a first search query through a communication interface;
receiving information identifying a second search query through the communication interface, wherein the first search query differs from the second search query;
accessing information characterizing prior input of the identified search queries by clients into a search engine, the information characterizing the prior input being stored in computer memory;
determining, from the accessed information characterizing the prior input, a query volume for the first search query during a first period of time for which prior input of the identified search queries is characterized by the information stored in the computer memory;
determining, from the accessed information characterizing the prior input, a query volume for the second search query during a second period of time for which prior input of the identified search queries is characterized by the information stored in the computer memory;
generating, using one or more processors, a first representation of the query volume for the first search query relative to two or more variables and a second representation of the query volume for the second search query relative to the two or more variables;
processing, using the one or more processors, the first representation and the second representation to generate a first set of wavelets representing the first representation and a second set of wavelets representing the second representation;
identifying, using the one or more processors, a first subset of wavelets having high magnitude coefficients for the first set of wavelets and a second subset of wavelets having high magnitude coefficients for the second set of wavelets;
generating, using the one or more processors, a first signature for the first representation based on the first subset of wavelets and a second signature for the second representation based on the second subset of wavelets; and determining, using the one or more processors, whether the first search query and the second search query are related by comparing the first signature to the second signature.

2. The method of claim 1, wherein the first period of time is the same as the second period of time.

3. The method of claim 2, wherein determining if the first search query and the second search query are related comprises:
    determining that the first search query and the second search query are related when the first representation and the second representation exhibit similar rises or decreases in query volume during the period of time.

4. The method of claim 3, wherein determining
    the query volume for the first search query and the query volume for the second search query comprises:
    normalizing the query volume for the first search query based on the search volume of the first search query relative to all queries during the period of time, and
    normalizing the query volume for the second search query based on the search volume of the second search query relative to all queries during the period of time.

5. The method of claim 1, further comprising displaying an indication that the first search query and the second search query are related on a display.

6. The method of claim 1, further comprising retrieving, using the one or more processors, search results related to the first query and the second query.

7. The method of claim 6, further comprising displaying the search results to a user on a display.

8. The method of claim 1, further comprising blurring the first representation and the second representation relative to all of the two or more variables before comparing the representations.

9. The method of claim 1, wherein the representations represent the query volume relative to more than two variables.

10. The method of claim 9, wherein one of the variables is geography.

11. The method of claim 1, wherein comparing the images comprises analyzing a plurality of subsets of a time span for the query volumes.

12. A computer-implemented method comprising:
    determining, using one or more processors, a query volume for a first search query during a first period of time from information indicating instances where the first search query has been entered into a search engine by clients;
    determining, using the one or more processors, a query volume for a second search query during a second period of time from information indicating instances where the first search query has been entered into a search engine by clients;
    generating, using the one or more processors, a first representation of the query volume for the first search query relative to two or more variables;
    generating, using the one or more processors, a second representation of the query volume for the second search query relative to the two or more variables;
    storing the first and second representations in computer memory;
    processing, using the one or more processors, the first representation to generate a first set of wavelets representing the first representation;
    processing, using the one or more processors, the second representation to generate a second set of wavelets representing the second representation;
    identifying, using the one or more processors, a first subset of top wavelets from the first set of wavelets and a second subset of top wavelets from the second set of wavelets; and
    determining, using the one or more processors, whether the first search query and the second search query are related by comparing a first signature generated based on at least some of the first set of wavelets to a second signature generated based on at least some of the second set of wavelets, wherein determining if the first search query and the second search query are related comprises determining whether the first search query and the second search query are related by comparing the first subset of top wavelets to the second subset of top wavelets.

13. The method of claim 12, wherein the first period of time is equal to the second period of time.

14. The method of claim 13, wherein determining a query volume for the first search query and a query volume for the second search query comprises:
    determining the query volume for the first search query based on the search volume of the first search query relative to all queries over the first period of time, and
    determining the query volume for the second search query based on the search volume of the second search query relative to all queries over the second period of time.

15. The method of claim 12, further comprising blurring the first representation and the second representation relative to all of the two or more variables before comparing the representations.

16. The method of claim 12, wherein the representations represent the query volume relative to more than two variables.

17. The method of claim 12, wherein comparing the wavelets comprises analyzing a plurality of subsets of a time span for the query volumes.

18. A computer-implemented method comprising:
    determining, using one or more processors, query volumes for each of a plurality of search queries during a period of time from information indicating instances where the search queries have been entered into a search engine by clients;
    generating, using the one or more processors, a plurality of representations of the query volumes for each respective search query relative to two or more variables during the period of time;
    storing the representations in computer memory;
    processing, using the one or more processors, the plurality of representations to generate a set of wavelets representing each of the plurality of representations;
    identifying, using the one or more processors, a respective subset of top wavelets for each set of wavelets;
    generating, using the one or more processors, signatures for each of the plurality of representations based on the subset of top wavelets for each respective representation; and
    determining, using the one or more processors, whether first and second of the search queries are related by comparing a signature corresponding to the first search query to a signature corresponding to the second search query.

19. The method of claim 18, wherein generating signatures for each of the plurality of representations comprises generating signatures for each of the plurality of representations using a min-hash algorithm to compress the subset of top wavelets.

20. The method of claim 18, further comprising identifying at least a portion of signatures for comparison using a hashing scheme.

21. The method of claim 20, wherein the hashing scheme is a locality sensitive hashing scheme.

22. The method of claim 18, further comprising blurring the representations relative to all of the two or more variables before comparing the representations.

23. The method of claim 18, wherein the representations represent the characteristics of the queries relative to more than two variables.

24. The method of claim 18, wherein comparing the signatures comprises analyzing a plurality of subsets of a time span for the query volumes.

25. A system comprising:
  means for determining query volumes for each of a plurality of search queries during the period of time from information indicating instances where the search queries have been entered into a search engine by clients;
  means for generating a plurality of representations of the query volumes for each respective search query of the plurality of search queries relative to two or more variables during the period of time;
  means for storing the representations in computer memory;
  means for processing the plurality of representations to generate a set of wavelets for each of the plurality of images;
  means for identifying a respective subset of top wavelets for each set of wavelets;
  means for generating signatures for each of the plurality of representations based on the subset of top wavelets for each respective representation; and
  means for determining whether first and second of the search queries are related, wherein the means for determining is operable to compare a signature corresponding to the first search query to a signature corresponding to the second search query.

26. The system of claim 25, wherein the means for generating signatures for each of the plurality of representations based on the subset of top wavelets for each respective representation comprises:
  means generating signatures for each of the plurality of representations using a min-hash algorithm to compress the subset of top wavelets.

27. The system of claim 25, further comprising means for identifying at least a portion of signatures for comparison using a hashing scheme.

28. The system of claim 25, further comprising means for blurring the representations relative to all of the two or more variables before generating the wavelets.

29. The system of claim 25, wherein the representations represent the characteristics of the queries relative to more than two variables.

30. The system of claim 25, wherein comparing the signatures comprises analyzing a plurality of subsets of a time span for the query volumes.

31. A system comprising:
  a data storage storing information characterizing search queries that have been entered into a search engine by clients and the timing of instances when the search queries have been entered into the search engine by the clients;
  one or more computers programmed to perform operations, the operations including:
    determining query volumes for each of a plurality of the search queries during a period from information in the data storage indicating the timing of the instances where the plurality of the search queries have been entered into the search engine by the clients;
    generating a plurality of representations of the query volumes for each respective search query of the plurality relative to two or more variables during the period;
    storing the plurality of representations;
    processing the plurality of representations to generate a set of wavelets representing each of the plurality of representations;
    identifying a respective subset of top wavelets for each set of wavelets;
    generating signatures for each of the plurality of representations based on the subset of top wavelets for each respective representation; and
    determining whether first and second of the search queries are related by comparing a signature for the first search query to a signature for the second search query.

32. The system of claim 31, wherein generating signatures for each of the plurality of representations comprises generating signatures for each of the plurality of representations using a mm-hash algorithm to compress the subset of top wavelets.

33. The system of claim 31, wherein generating signatures for each of the plurality of representations comprises generating signatures for each of the plurality of representations using a mm-hash algorithm to compress the subset of top wavelets.

34. The system of claim 31, wherein the operations further comprise identifying at least a portion of signatures for comparison using a hashing scheme.

35. The system of claim 34, wherein the hashing scheme is a locality sensitive hashing scheme in which small, random, but non-overlapping members of the signatures are selected and repeatedly hashed into bins.

36. The system of claim 31, wherein the one or more computers is programmed to implement a query processing system to determine whether the first and second of the search queries are related.

37. The system of claim 31, further comprising the clients in communication with the one or more computers over one or more data communication networks, the clients having input the search queries into the search engine.

38. A system comprising:
  a data storage storing information characterizing the timing of prior input of search queries by clients into a search engine;
  one or more computers programmed to perform operations, the operations including:
    receiving information identifying a first search query;
    receiving information identifying a second search query, wherein the first search query differs from the second search query;
    accessing information stored in the data storage, the information characterizing the prior input of the identified search queries into the search engine;
    determining, from the accessed information characterizing the prior input, a query volume for the first search query during a first period of time for which prior input of the identified search queries is characterized by the information stored in the computer memory;
    determining, from the accessed information characterizing the prior input, a query volume for the second search query during a second period of time for which prior input of the identified search queries is characterized by the information stored in the computer memory;

generating a first representation of the query volume for the first search query relative to two or more variables and a second representation of the query volume for the second search query relative to the two or more variables;

processing the first representation and the second representation to generate a first set of wavelets representing the first representation and a second set of wavelets representing the second representation;

identifying a first subset of wavelets having high magnitude coefficients for the first set of wavelets and a second subset of wavelets having high magnitude coefficients for the second set of wavelets;

generating a first signature for the first representation based on the first subset wavelets and a second signature for the second representation based on the second subset of wavelets; and determining whether the first search query and the second search query are related by comparing the first signature to the second signature.

39. The system of claim 38, wherein the first period of time is the same as the second.

40. The system of claim 39, wherein determining if the first search query and the second search query are related comprises:

determining that the first search query and the second search query are related when the first representation and the second representation exhibit similar rises or decreases in query volume during the period of time.

41. The system of claim 40, wherein determining the query volume for the first search query and the query volume for the second search query comprises:

normalizing the query volume for the first search query based on the search volume of the first search query relative to all queries during the period of time, and normalizing the query volume for the second search query based on the search volume of the second search query relative to all queries during the period of time.

42. The system of claim 38, further comprising displaying an indication that the first search query and the second search query are related on a display.

43. The system of claim 38, further comprising retrieving search results related to the first query and the second query.

44. The system of claim 43, further comprising the clients in communication with the one or more computers over one or more data communication networks, the clients programmed to display the search results to a user on displays.

45. A system comprising:

a data storage storing information characterizing the timing of prior instances where of a first search query and a second search query into a search engine;

one or more computers programmed to perform operations, the operations including:

determining a query volume for the first search query during a first period of time from information indicating the instances where the first search query has been entered into a search engine by clients;

determining a query volume for a second search query during a second period of time from information indicating the instances where the first search query has been entered into a search engine by clients;

generating a first representation of the query volume for the first search query relative to two or more variables;

generating a second representation of the query volume for the second search query relative to the two or more variables;

storing the first and second representations;

processing the first representation to generate a first set of wavelets representing the first representation;

processing the second representation to generate a second set of wavelets representing the second representation;

identifying a first subset of top wavelets from the first set of wavelets and a second subset of top wavelets from the second set of wavelets; and determining whether the first search query and the second search query are related by comparing a first signature generated based on at least some of the first set of wavelets to a second signature generated based on at least some of the second set of wavelets, wherein determining if the first search query and the second search query are related comprises determining whether the first search query and the second search query are related by comparing the first subset of top wavelets to the second subset of top wavelets.

46. The system of claim 45, wherein the first period of time is equal to the second period of time.

47. The system of claim 46, wherein determining a query volume for the first search query and a query volume for the second search query comprises:

determining the query volume for the first search query based on the search volume of the first search query relative to all queries over the first period of time, and determining the query volume for the second search query based on the search volume of the second search query relative to all queries over the second period of time.

* * * * *

UNITED STATES PATENT AND TRADEMARK OFFICE
CERTIFICATE OF CORRECTION

| | | |
|---|---|---|
| PATENT NO. | : 8,019,742 B1 | Page 1 of 1 |
| APPLICATION NO. | : 11/756127 | |
| DATED | : September 13, 2011 | |
| INVENTOR(S) | : Shumeet Baluja et al. | |

It is certified that error appears in the above-identified patent and that said Letters Patent is hereby corrected as shown below:

In Column 14, Line 24, Claim 32, delete "mm-hash" and insert -- min-hash --.

In Column 14, Line 29, Claim 33, delete "mm-hash" and insert -- min-hash --.

In Column 15, Line 18, Claim 38, before "wavelets" insert -- of --.

Signed and Sealed this
Fifteenth Day of November, 2011

David J. Kappos
*Director of the United States Patent and Trademark Office*